United States Patent [19]

Illing

[11] 4,036,470
[45] July 19, 1977

[54] CANTILEVERED BALL VALVE

[75] Inventor: Henry Illing, Parksville, N.Y.

[73] Assignee: Kieley & Mueller, Inc., Middletown, N.Y.

[21] Appl. No.: 358,830

[22] Filed: May 9, 1973

[51] Int. Cl.² ............................................. F16K 5/06
[52] U.S. Cl. .................................. 251/309; 251/192; 251/283; 251/315
[58] Field of Search ............... 251/298, 299, 300, 301, 251/302, 303, 304, 305, 306, 307, 308, 309, 208, 209, 181, 192, 283, 315

[56] References Cited

U.S. PATENT DOCUMENTS

| | | | |
|---|---|---|---|
| 2,803,426 | 8/1957 | De Zurik | 251/309 X |
| 2,907,548 | 10/1959 | Haas et al. | 251/308 X |
| 2,934,311 | 4/1960 | Sjöholm | 251/209 |
| 3,214,133 | 10/1965 | Rodgers et al. | 251/301 X |
| 3,456,916 | 7/1969 | Ytzen et al. | 251/309 |
| 3,475,003 | 10/1969 | Paluszek | 251/163 |
| 3,475,003 | 10/1969 | Paluszek | 251/309 X |
| 3,779,511 | 12/1973 | Wenglar | 251/308 X |

FOREIGN PATENT DOCUMENTS 866,642 4/1961 United Kingdom

OTHER PUBLICATIONS

*Mechanics of Materials,* Miller et al, International Textbook Company, pp. 256, 257.

*Primary Examiner*—Carroll B. Dority, Jr.
*Assistant Examiner*—Ira S. Lazarus
*Attorney, Agent, or Firm*—Kenyon & Kenyon, Reilly, Carr & Chapin

[57] ABSTRACT

The valve body is in the form of a segmented ball section and is integrally formed on a rotatable spindle as a cantilevered extension of the spindle. The segmented ball section includes an annular seating surface on one side for seating and sealing engagement with a valve seat in one of the openings of the valve. The opposite surface of the extension is substantially flat to present a limited profile to flow when the valve body is moved out of sealing engagement with the valve seat into an open position. The configuration of the valve body places 20% less ball structure in the flowing stream compared to existing partial ball constructions. The one-sided mounting of the valve body permits complete removal of trim for maintenance or replacement without removal of the valve body from a pipeline. Thus, "out of line" trim changes can be made without having to pull the valve from the pipe.

13 Claims, 6 Drawing Figures

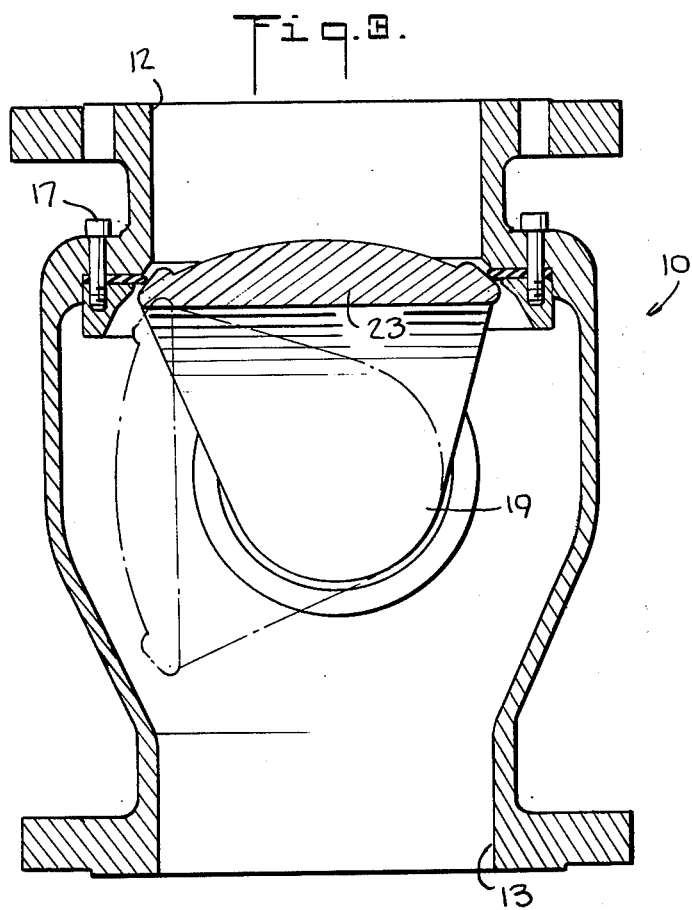
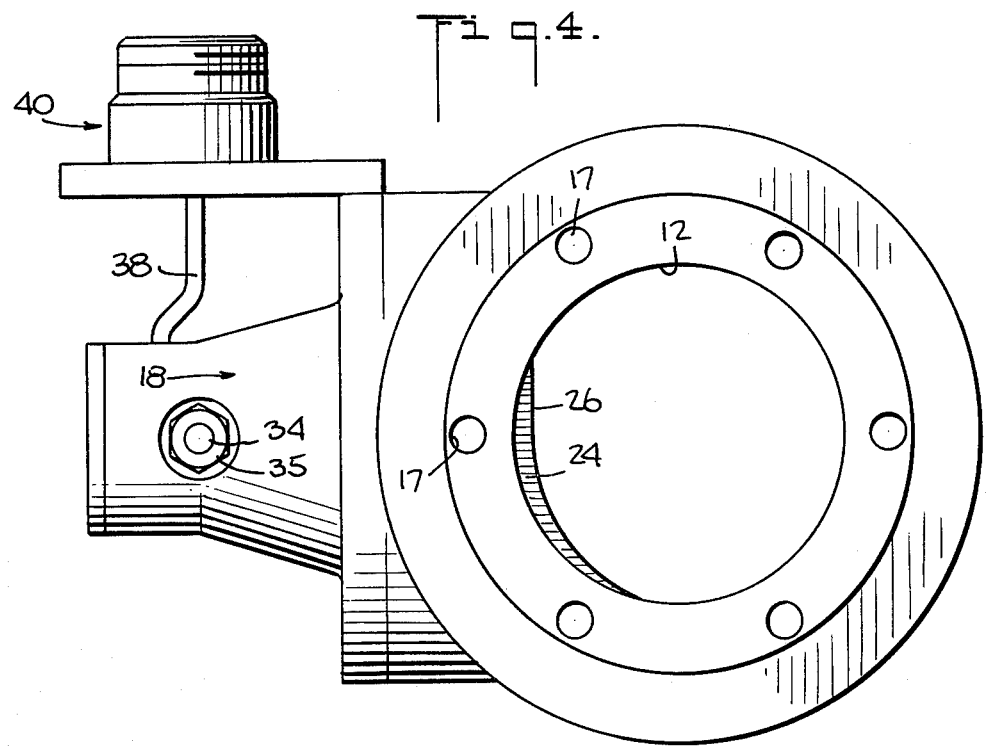

CANTILEVERED BALL VALVE

This invention is directed to a valve and particularly to a ball valve.

Heretofore, various types of ball valves have been known for use in pipelines. In some instances, the valves have been constructed with full or partial ball members which have a straight through bore to close off or open the pipeline to flow. In these instances, the ball members have frequently been keyed, welded or splined into a drive shaft in order to provide a means for turning the ball member. Also, in order to guide the ball members without imparting excessive bending stresses in the drive shaft, a through shaft has been used or an idler shaft has been used opposite the drive shaft to guide the ball member. In some instances, where the valves have been constructed as three-way valves, the ball members have been provided with formed bores which permit communication between only two of any three pipes connected to the valve. The control of these ball members have also been effected in similar manner through shafts attached to the ball members by splinning, keying, press-fitting or welding.

However, these types of connections require relatively high manufacturing and assembly costs. Also, where it has been necessary to remove or replace the trim or ball member in such valves, such can only be accomplished by removal of the entire valve from the pipeline. As a result, the maintenance costs for pipelines using such valves has been relatively high. Generally, this is referred to as an "out of line" trim change.

Because of the use of separate components such as a drive shaft, ball member and idler shafts in these prior valves, there has been an accumulation of adverse tolerances. In such cases, shims have been used to compensate for the lateral and axial accumulation of tolerances. This, of course, leads to additional time and cost for assembly and maintenance. Still further, when these valves have been moved into an open position, the various balls have limited the amount of cross-sectional port area available to the flow of fluid.

Accordingly, it is an object of this invention to provide a ball valve which permits in-line replacement of the trim.

It is another object of the invention to provide a ball valve which provides a maximum port area for flowing.

It is another object of the invention to allow a complete trim and seat change without removal from a pipeline.

It is another object of the invention to eliminate weld, spline, and key connections between a ball member and a drive spindle.

It is another object of the invention to eliminate the accumulation of adverse tolerances in a ball valve.

Briefly, the invention provides a ball valve having a valve housing with at least two openings for passage of a fluid flow, at least one valve seat in one of the openings, a spindle rotatably mounted in the housing and a valve body in the form of a segmented ball section mounted on the spindle as a cantilevered extension. The segmented ball section has an annular seating surface on one side for seating and sealing engagement with the valve seat while a substantially flat surface is provided on the opposite side. When the valve is closed, the ball member seats in sealing relation with the valve seat. When the valve is open, the spindle is rotated to move the ball member away from the valve seat and substantially out of the plane of the valve opening and, thus, out of the path of flow.

The valve body is integrally formed on the spindle to eliminate the need for a shaft-to-ball attachment means such as keys, splines, welding, press fitting and the like.

As the ball section is mounted on only one side, complete removal of the trim of the valve for maintenance or replacement can be effected when the ball section is moved to an open position without removal of the valve body from a pipeline. This can be facilitated by using an eccentrically mounted bonnet or by use of an access hole diametrically opposite the spindle.

The flat surface of the ball section provides a configuration which places less ball structure in the flowing stream through a pipeline as compared to existing partial ball constructions. This increases the $C_v$ while reducing actuator forces. For, example, 20% less ball structure is placed in the flowing stream as compared to existing partial ball designs.

In one embodiment, the valve has a second non-sealing ball section opposite the sealing ball section to provide for a double-stage pressure reduction for cavitation control and noise reduction. This non-sealing ball section may be perforated with breakdown orifices for noise reduction.

In order to compensate for any large forces on the segmental ball member, the spindle is made with a compromised constant stress beam section as well as with a large hub section to minimize cantilevered bending of the ball member. Also, where there would be high pressure drops, the spindle is mounted in anti-friction ball or roller bearings to reduce frictional moments caused by the large spindle diameter.

These and other objects and advantages of the invention will become more apparent from the following detailed description and appended claims taken in conjunction with the accompanying drawings in which:

FIg. 3 illustrates a view taken on line 3—3 of FIG. 2;

FIG. 4 illustrates an end view of the valve of FIG. 1 in an open position;

Figure 2:
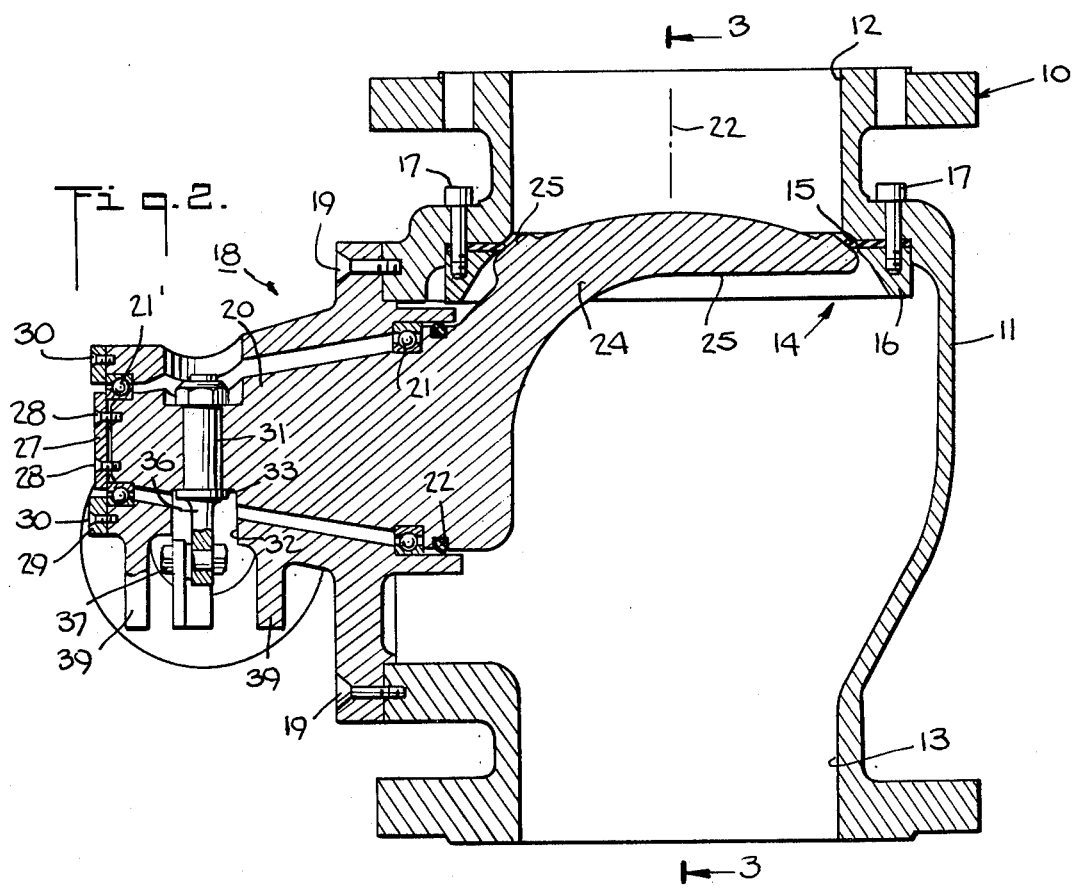
FIG. 2 illustrates a view taken on line 2—2 of FIG. 1.

Referring to FIG. 2, the valve 10 includes a housing 11 which is adapted for insertion in a pipeline and, for such purposes, includes an inlet opening 12 on one side and an outlet opening 13 on the opposite side for a fluid flow. In addition, a valve seat 14 is formed within the housing 11 near to the inlet opening 12. This valve seat 14 is formed by a seal ring or gasket 15, for example, of Teflon or other plastic compound or of metal as well as a split retaining ring 16 both of which are secured within a recess in the housing 11 coaxially of the inlet opening 12. The retaining ring 16 is secured in place by a plurality of bolts 17 which pass through a contoured portion of the housing 11 and abut on the exterior of the housing 11. As shown, each externally mounted bolt 17 threads into the retaining ring 16 to secure the retaining ring 16 in place and to clamp the seal ring 15 between the retaining ring 16 and the housing 11.

Figure 1:
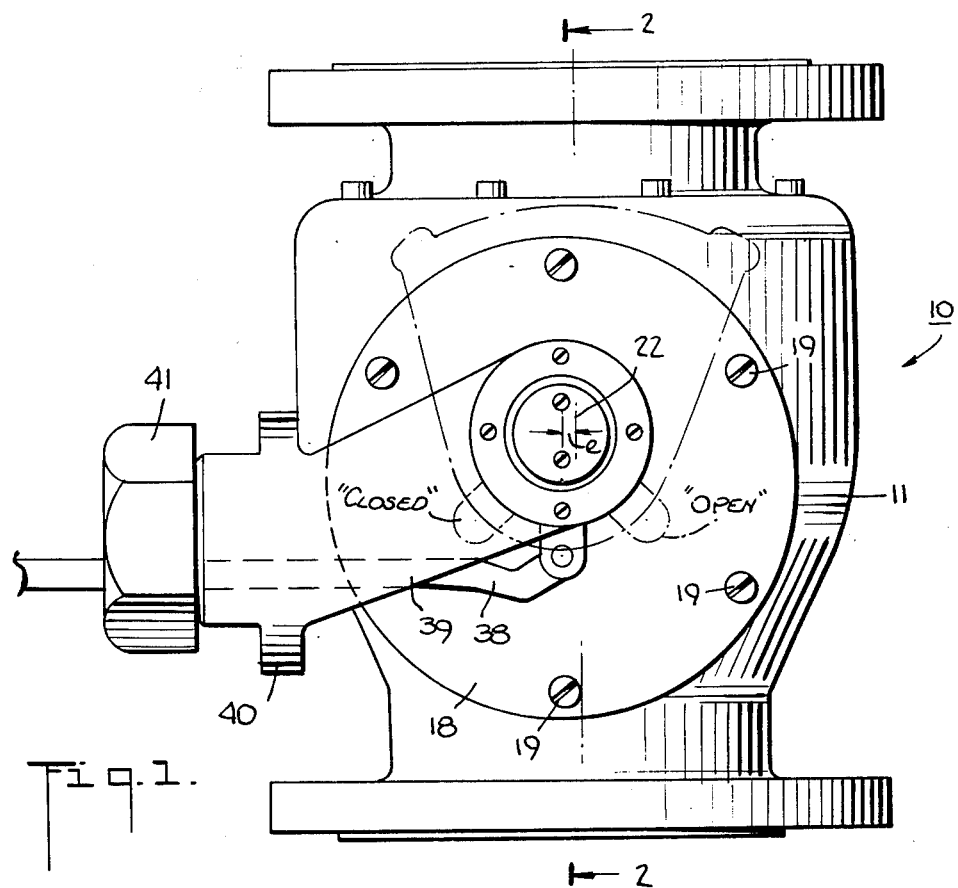
FIG. 1 illustrates a side view of a valve according to the invention.

The valve 10 also has a cone-shaped bonnet 18 mounted on a sidewall of the housing 11 over a suitable opening by means of a series of screws 19. This bonnet 18 serves to journal a spindle or shaft 20 therein by means of anti-friction bearings 21, 21'. One bearing 21 may act as a radial bearing while the other bearing 21' acts as a thrust bearing. In addition, a suitable seal, such as an O-ring 22, is mounted between the spindle 20 and the bonnet 18 at an inner end to preclude leakage of fluid from within the housing 11. This seal 22 can be of a type which is suitable for normal temperature ranges or can be a face-type carbon for high temperatures. The spindle 20 is eccentrically mounted with respect to the mating surfaces of the bonnet 18 and housing 11 as well as to the centerline 23 of flow extending from the housing 11 through the inlet 12 and through the outlet 13. This eccentricity $e$ is shown in FIG. 1 and will be explained hereinafter. In addition, the spindle 20 has an inner end which projects into the housing 11 to a plane outside of the projected plane of the inlet opening 12.

The spindle 20 has a valve body 24 integrally formed thereon as a cantilevered extension which extends into the valve housing 11. This valve body 24 is in the form of a segmented ball member and has an annular seating surface 25 on one side for sealingly seating on the ring 15 of the valve seat 14 when the valve is closed. The side on which the seating surface 25 is positioned is of generally spherical shape within the confines of the seating surface 25 while the opposite side 26 is substantially flat. The ball member 24 is of a thickness as shown to be confined substantially within the plane of the retaining ring 16. As shown, the ball member 24 is in the shape of a curved tapered cantilever beam. Also, the retaining ring 16 has a spherical surface to permit movement of the ball member 24 intoand out of seating engagement with the seal ring 15.

As shown in FIGS. 2 and 3, the segmented ball member 24 extends from a peripheral portion of the spindle 20 so that the surfaces 25, 26 are offset radially from the longitudinal axis of the spindle 20.

Referring to FIG. 2, the spindle 20 is tapered radially inwardly in a direction away from the ball member 24 to provide an approximate constant stress beam section, i.e. the spindle 20 has a section modulus that reduces at about the same rate as the bending moment and therefore gives a relatively constant bending stress to about the region of pin 31, and is formed with a large hub section to minimize cantilevered bending of the segmented ball member 24. For high pressure drops, either ball or roller bearings 21 may be used to reduce frictional moments caused by the large shaft diameter. For lower pressure drops, the spindle can be mounted in a friction-type bearing. The spindle 20 is secured in place by means of a lock plate 27 which abuts the thrust bearing 21' at the outer end of the spindle 20 and is secured by screws 28 threaded into the spindle, and a retaining plate 29 which is secured by screws 30 to the bonnet 18 to hold the outer race of the bearing 21' in place.

In order to rotate the spindle 20 and, thus, the valve body 24 from a closed position as shown in FIGS. 2 and 3, to an open position as shown in phantom in FIG. 3 and in full line in FIG. 4, a pin 31 is passed through the spindle 20 through a slot 32 in the bonnet 18. As shown in FIG. 2, the pin 31 has a collar 33 abutting the spindle 20 on one side while the opposite end 34 is threaded to receive a locking nut 35 to secure the pin 31 in place. In addition, the pin 31 carries a bar-like extension 36 which extends out of he slot 32 of the bonnet 18. This extension 36 is pinned by a suitable nut and bolt assembly 37 to a link 38 which passes between two walls 39 on the bonnet 18.

Referring to FIGS. 1 and 2, the walls 39 extend from the bonnet 18 to an annular ring-like member 40 through which the link 38 passes. This latter member 40 is threaded at one end to receive a nut 41. The link 38 passes to a suitable actuating means (not shown) which is able to reciprocate the link 38 to cause the bar 36 to pivot between a closed position for the valve body 24 and an open position for the valve body 24. In this respect, it is noted that FIG. 2 illustrates the position of the bar 36, 45°out of position. FIG. 1 shows the bar 36 in dotted lines for the open and closed positions as labelled.

Referring to FIG. 4, when the valve 10 is in the open position, the valve body 24 is perpendicular to the valve seat 14 with the inside surface 26 of the valve body 24 and the contiguous curvilinear transition surface to the spindle 20 projecting slightly into the projected plane of the annular flow passageway formed by the inlet opening 12. The blockage area occupied by the valve body 24 is, however, of minimal area.

In order to remove the valve seat 14 from the valve 10, the spindle 20 is rotated into the open position (FIG. 4). The bolts 17 can then be loosened and the retaining ring 16 and the sealing ring 15 removed, for example, through the bonnet opening for "in-line" trim change after the bonnet 18 is removed or through the inlet opening 12 or the outlet opening 13, whichever is exposed. A replacement valve seat can then be installed in a reverse manner. The removal of the retaining ring 16 and sealing ring 25 is facilitated by the eccentric mounting of the bonnet 18 and spindle 20 on the housing 11. This mounting arrangement provides a bonnet opening in the housing 11 that is sufficiently large for removal of the ball without creating a large physical size of the housing 11.

Figure 5:
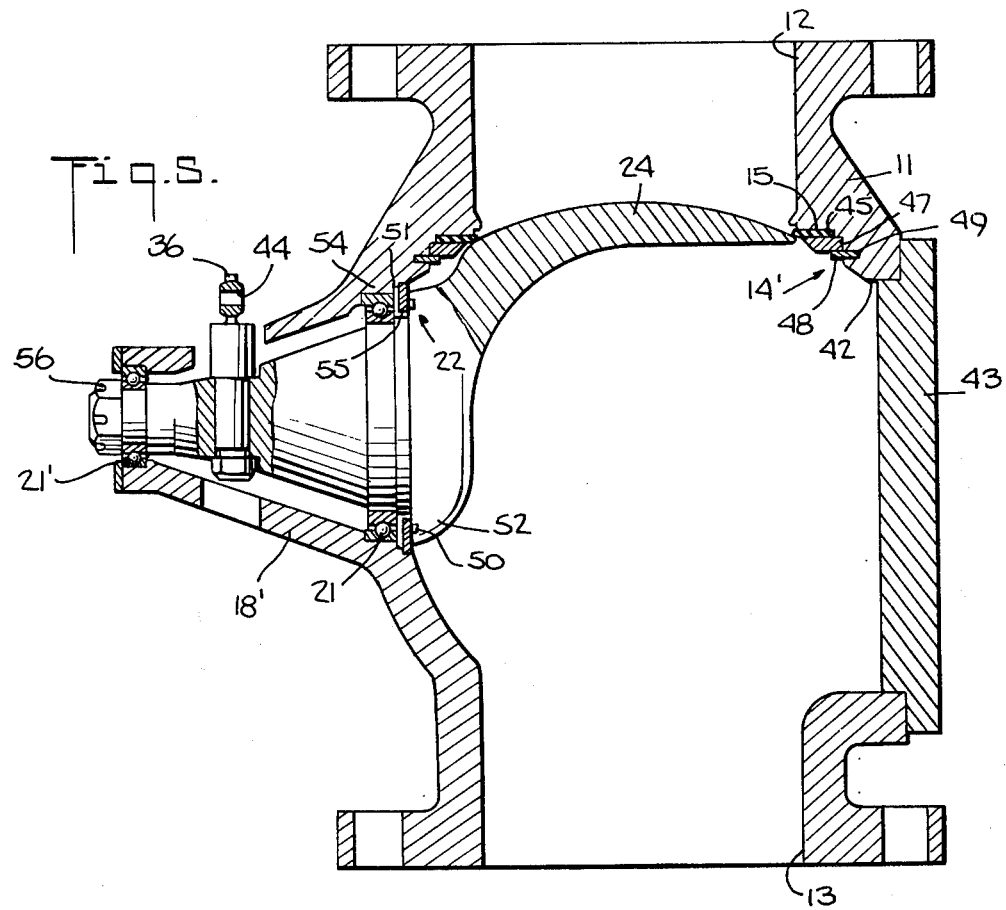
FIG. 5 illustrates a modified valve according to the invention having an access opening opposite the valve spindle.

Referring to FIG. 5, wherein like reference characters indicate like parts as above, in order to provide for an in-line replacement of the valve seat 14, especially where access cannot be made through the inlet or outlet openings 12, 13, an access opening 42 is formed in the valve housing 11. This opening 42 is placed diametrically opposite the spindle 20 and is covered over by a cover plate 43 which is secured in place, for example, by threading or by bolts (not shown). In this case, the separate bonnet 18 is an integral part of the housing 11.

As shown, the pin 31 which is used to rotate the spindle 20 can alternatively carry a spherical-type ball rod end 44 in the projecting bar 36 to receive a link or other rod (not shown) for rotating the spindle 20 between the closed and opened positions of the valve. Also, as shown the valve seat 14 need not be bolted in place from the outside of the housing 11. Instead, the valve seat 14 can be formed of a sealing ring 15 which seats in a mating recess 45, a retaining ring 46 which seats in another mating recess 47 to hold the seal ring 15 in place and a split retaining ring 48 which is snapped into a groove 49 whithin the housing 11.

As shown in FIG. 5, the bonnet 18 can be intergrally formed on the housing 11 and the seal 22 for sealing the inner end of the spindle 20 to the valve housing 11 may be constituted by a pair of O-rings 50, 51 one of which is disposed within a groove in an annular collar 52 of the spindle 20 and the other of which is disposed within a groove 53 in a shoulder 54 of the housing 11 as well as a sealing disc 55 between the two O-rings 50, 51. In addition, the spindle 20 can alternatively have a threaded end which passes through the bonnet 18 and has a nut 56 threaded thereon to secure the bearing 21' in place against a shoulder of the spindle 20.

In order to replace a trim 14', the cover plate 43 is removed from the housing 11. Thereafter, the split retaining ring 48 is removed from the groove 49 is a known manner and the retaining ring 46 and seal ring 15 removed and replaced. At this time, as above, the ball member 24 would be moved into the open position.

Figure 6:
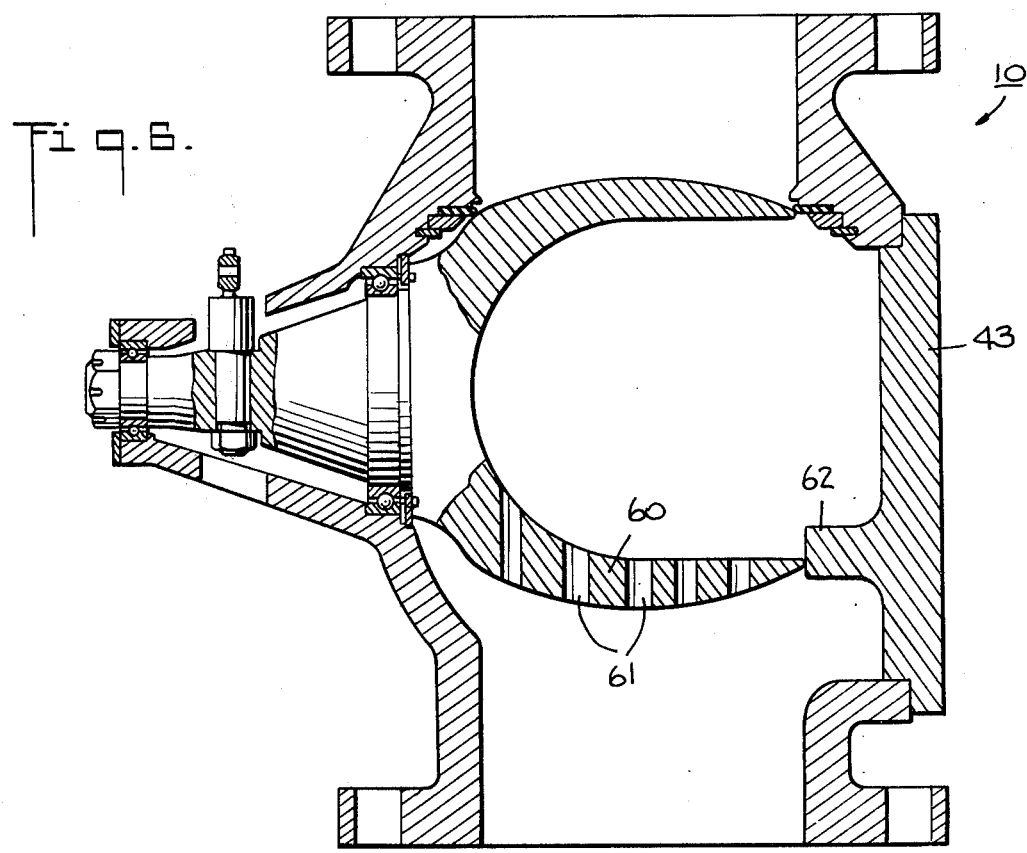
FIg. 6 illustrates a cross-sectional view of a modified valve for double-stage pressure reduction.

Referring to FIG. 6, wherein like reference characters indicate like parts as above, in order to provide for a double-stage pressure reduction for cavitation control and noise reduction, a second non-sealing segmented ball member 60 is mounted on the spindle 20 in the same cantilever fashion as the sealing ball member 24. This second non-sealing segmented ball member 60 is disposed in parallel opposite the sealing ball member 24 and is perforated with breakdown orifices 61 to break up the large stream flow into many small ones for noise reduction. As shown, the cover 43 is provided on the inside surface with a ledge 62 which is sized to lie opposite to and in close-fit relation with the non-sealing ball member 60 when the valve 10 is closed. This ledge 62 forms an obstruction to flow that would otherwise bypass the orifice 61.

When the valve 10' is moved toward the opened position, the two extension 24, 60 of the spindle 20 lie on opposite sides of the flow path. The non-sealing extension 60 thus provides a path of communication from the flow path of fluid passing between the extensions and the outer side of the nonsealing extension to reduce the possibility of cavitation while also reducing noise.

The invention thus provides a ball valve having a single spindle or shaft mounted for the support of the ball member which is of simple construction. The invention further provides a valve which has a maximum port area throughout and which eliminates the need for any spline, weld or key connections between the valve body and the actuating spindle.

Further, a trim change, that is, a change of the seal ring 15 and ball member 24 can be carried out quickly and easily.

What is claimed is:

1. A cantilevered ball valve comprising
  a valve housing at least two openings for passage of fluid flow and an access opening,
  a plate removably covering said access opening;
  at least one annular valve seat mounted within said housing around one of said two openings, said valve seat being removably mounted through said access opening;
  a spindle rotatably mounted in said housing on a longitudinal axis diametrically opposite said access opening, and
  a valve body integrally formed on said spindle, said valve body constituting a cantilevered extension of said spindle having an annular seating surface on one side for sealing seating on said valve seat and a substantially flat surface on the opposite side, said extension extending from a peripheral portion of said spindle with said surfaces offset radially from said longitudinal axis of said spindle.

2. A cantilevered ball valve as set forth in claim 1 further comprising means for rotating said spindle between a first position in which said seating surface is in sealing contact with said valve seat and a second position in which said seating surface is disposed perpendicular to said valve seat.

3. A cantilevered ball valve as set forth in claim 1 wherein said housing includes a bonnet mounted eccentrically thereon over said access opening and said spindle is rotatably mounted in said bonnet.

4. A cantilevered ball valve as set forth in claim 1 wherein said extension is mounted in spaced relation to said spindle longitudinal axis.

5. A cantilevered ball valve as set forth in claim 1 wherein said spindle is of relatively large cross-section and is tapered radially inwardly in a direction away from said extension.

6. A cantilevered ball valve as set forth in claim 1 further comprising anti-friction bearings rotatably mounting said spindle in said housing.

7. A cantilevered ball valve as set forth in claim 1 which further comprises a second cantilevered extension extending from said spindle in spaced parallel relation to said first cantilevered extension.

8. A cantilevered ball valve as set forth in claim 7 wherein said second extension is perforated.

9. A cantilevered ball valve as set forth in claim 1 further comprising means for rotating said spindle.

10. A cantilevered ball valve as set forth in claim 1 wherein said openings are coaxially disposed on a common centerline and said spindle is rotatable to position said valve body substantially out of the projected plane of said openings.

11. A cantilevered ball valve comprising
  a valve housing having at least two openings for passage of a fluid flow,
  at least one annular valve seat mounted within said housing around one of said openings,
  a spindle rotatably mounted in said housing on a longitudinal axis,
  a valve body integrally formed on said spindle, said valve body constituting a cantilevered extension of said spindle having an annular seating surface on one side for sealing seating on said valve seat and a substantially flat surface on the opposite side, said extension extending from a peripheral portion of said spindle with said surfaces offset radially from said longitudinal axis of said spindle, and
  a second cantilevered extension extending from said spindle in spaced parallel relation to said first cantilevered extension.

12. A cantilevered ball valve as set forth in claim 11 wherein said second extension is perforated.

13. A cantilevered ball valve as set forth in claim 11 further comprising means for rotating said spindle between a first position in which said seating surface is in sealing contact with said valve seat and a second position in which said seating surface is disposed perpendicular to said valve seat.

* * * * *